US012704586B2

(12) United States Patent
Desbazeilles et al.

(10) Patent No.: US 12,704,586 B2
(45) Date of Patent: Aug. 11, 2026

(54) UWB DEVICE LOCALIZATION

(71) Applicant: VALEO COMFORT AND DRIVING ASSISTANCE, Créteil (FR)

(72) Inventors: Eloi Desbazeilles, Creteil (FR); Onur Oguz, Creteil (FR); Kawtar Es-Saghir, Creteil (FR); Georges Djokic, Creteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 334 days.

(21) Appl. No.: 18/525,858

(22) Filed: Dec. 1, 2023

(65) Prior Publication Data

US 2024/0183932 A1 Jun. 6, 2024

(30) Foreign Application Priority Data

Dec. 1, 2022 (FR) ........................................ 2212652

(51) Int. Cl.
*G01S 5/02* (2010.01)

(52) U.S. Cl.
CPC .................................. *G01S 5/0278* (2013.01)

(58) Field of Classification Search
CPC ........ G01S 5/0278; G01S 5/14; G01S 5/0284; G01S 5/02; G01S 5/0268; G06F 17/18; G06N 20/00
See application file for complete search history.

(56) References Cited

U.S. PATENT DOCUMENTS

| | | | | |
|---|---|---|---|---|
| 10,929,774 | B2 * | 2/2021 | Conroy | G06N 20/00 |
| 2006/0270918 | A1 * | 11/2006 | Stupp | G16H 10/20 128/920 |
| 2021/0302536 | A1 * | 9/2021 | Casamassima | G01S 5/0278 |
| 2024/0183932 | A1 * | 6/2024 | Desbazeilles | G01S 5/14 |

OTHER PUBLICATIONS

Henk Wymeersch, Stefano Maranò, Wesley M. Gifford, and Moe Z. Win, "A Machine Learning Approach to Ranging Error Mitigation for UWB Localization", IEEE Transactions on Communications, vol. 60, No. 6, Jun. 2012 (Year: 2012).*

Paul Meissner, Erik Leitinger, Markus Frohle, and Klaus Witrisal, "Accurate and Robust Indoor Localization Systems using Ultra-wideband Signals", arXiv:1304.7928v1 [cs.ET] Apr. 30, 2013 (Year: 2013).*

* cited by examiner

*Primary Examiner* — Charles N Appiah
*Assistant Examiner* — Sang Phuoc Le
(74) *Attorney, Agent, or Firm* — Osha Bergman Watanabe & Burton LLP

(57) ABSTRACT

The invention relates to a method implemented by a vehicle UWB system including at least two UWB sensors, with a view to determining a zone in which a UWB device is located among a predetermined set of zones, by applying a function dependent on a set of physical quantities. The function comprises one or more generalized linear models. The method comprises, by each respective UWB sensor, a measurement with a view to obtaining a measured value of the respective physical quantity. The method comprises, for each generalized linear model comprising at least one physical quantity for which the measurement failed, and for each physical quantity for which the measurement failed, determination of a replacement value of the physical quantity for application of the generalized linear model. The method improves localization of the UWB device.

9 Claims, 5 Drawing Sheets

UWB DEVICE LOCALIZATION

TECHNICAL FIELD

The present disclosure relates to location of UWB devices (UWB being the acronym of "Ultra Wide Band"), and more particularly to a method, a computer program and a UWB system for determining a zone in which a UWB device is among a predetermined set of zones.

TECHNICAL BACKGROUND

At the present time some vehicles are equipped with a UWB system comprising at least two UWB sensors that are installed in the vehicle. Such a UWB system is capable, based on a set of physical quantities dependent on the position of the UWB device with respect to the UWB sensors of the system, of localizing the UWB device by determining a zone in which the UWB device is located. To achieve this localization, a function may be applied with a view to determining, based on the set of physical quantities, the zone in which the UWB device is located among a predetermined set of zones. Such a function may comprise a generalized linear model taking as input the set of physical quantities and delivering as output a result through application of weights of the generalized linear model to the physical quantities of the set and comparison with a decision boundary of the generalized linear model.

The physical quantities used generally comprise values that are obtained from measurements taken by the UWB sensors. However, such measurements may fail, for example because of an obstruction between a UWB sensor and the UWB device at the time of measurement by the UWB sensor. When a measurement fails, the physical quantity that was to be obtained by the measurement has no value. Thus, in case of failure of measurement(s), due to the absence of a (or more than one) value(s) from the set of physical quantities, it is not possible to apply the generalized linear model, and therefore to localize the UWB device.

Therefore, there is a need to improve UWB device localization.

SUMMARY

To this end a method is provided, which is implemented by a vehicle UWB system including at least two UWB sensors, with a view to determining a zone in which a UWB device is located among a predetermined set of zones, by applying a function dependent on a set of physical quantities. The set of physical quantities includes, for each respective UWB sensor, at least one respective physical quantity dependent on the position of the UWB device with respect to the respective UWB sensor. The function comprises one or more generalized linear models. Each generalized linear model takes as input a respective subset of the physical quantities. Each generalized linear model comprises respective weights and a respective decision boundary. The method comprises, by each respective UWB sensor, a measurement with a view to obtaining a measured value of the respective physical quantity. The measurement by one or more first UWB sensors succeeds and the measurement by one or more second UWB sensors fails. The respective subset of at least one generalized linear model comprises at least one physical quantity for which the measurement failed. The method comprises, for each generalized linear model comprising at least one physical quantity for which the measurement failed, and for each physical quantity for which the measurement failed, determination of a replacement value of the physical quantity for application of the generalized linear model. The replacement value is equal to the antecedent of the respective decision boundary by the generalized linear model divided by the sum of the respective weights. The method comprises evaluation of the function based on the set consisting of each measured value and of each replacement value.

At least one generalized linear model may comprise a respective standardization block for each physical quantity of the respective subset.

Standardization may comprise subtraction of the physical quantity by a mean and division of the result of the subtraction by a standard deviation. The mean and standard deviation may have been obtained during training of the generalized linear model.

The method may comprise an obstruction between the respective UWB sensor and the UWB device at the time of measurement during at least one failed measurement.

The obstruction of the at least one failed measurement has a duration greater than 5 seconds, 10 seconds, 30 seconds or 1 minute.

For each respective UWB sensor, the at least one respective physical quantity dependent on the position of the UWB device with respect to the respective UWB sensor may comprise a time of flight and/or a power.

At least one generalized linear model may be a logistic regression.

The predetermined set of zones may consist of two zones. The function may consist of a single generalized linear model.

The predetermined set of zones may comprise at least three zones. The function may comprise a plurality of generalized linear models each for one respective pair of the at least three zones and a decision layer delivering a result based on the results of each of the generalized linear models.

A computer program for a vehicle UWB system is also provided. The computer program comprises instructions for carrying out the method.

A vehicle UWB system is also provided. The UWB system is configured to execute the method. The UWB system comprises a memory on which the computer program is stored.

BRIEF DESCRIPTION OF THE FIGURES

Non-limiting examples will be described with reference to the following figures.

DETAILED DESCRIPTION

Figure 1:
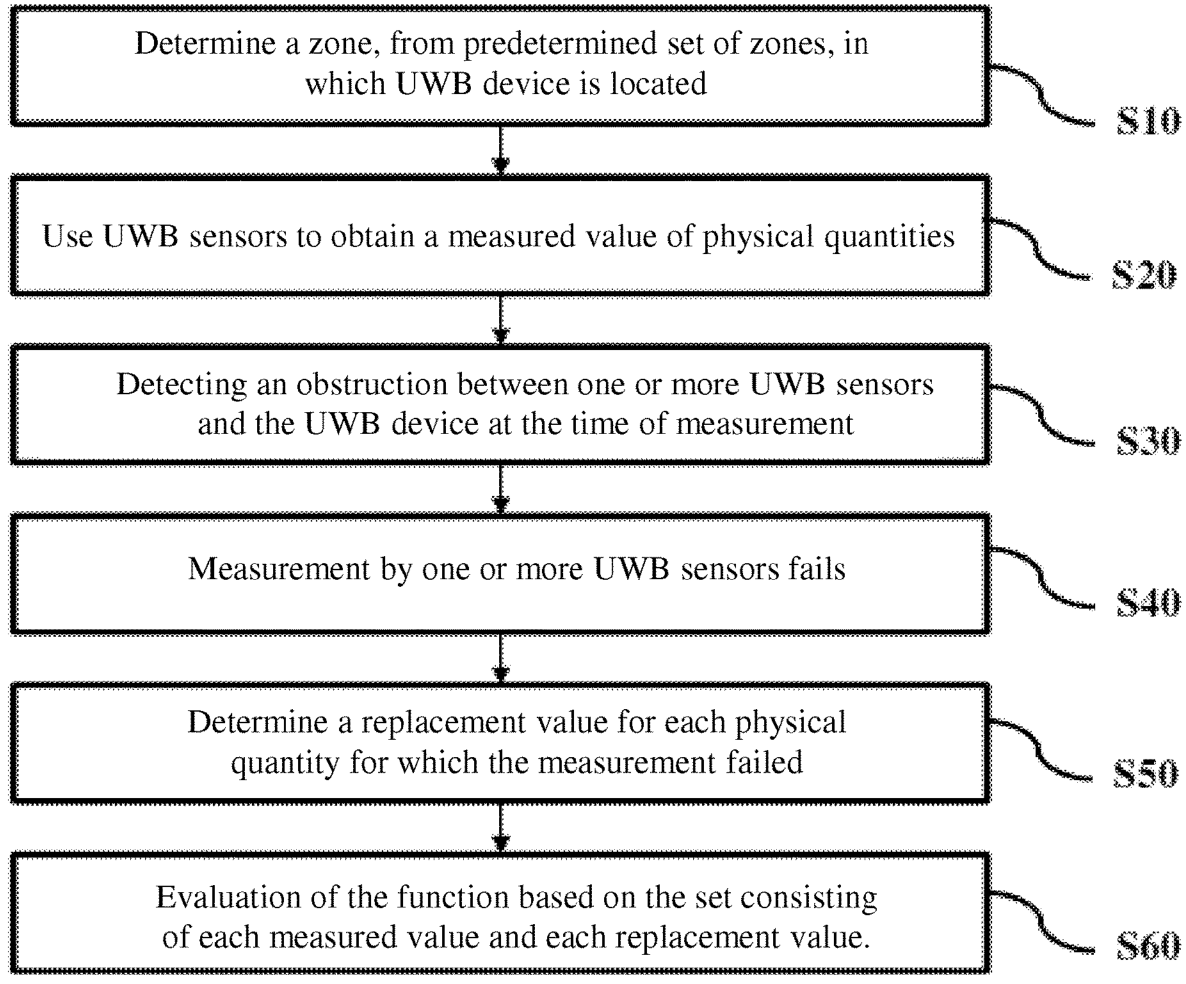
FIG. 1 illustrates one example of a flowchart of the method.

A method, which is implemented by a vehicle UWB system including at least two UWB sensors, with a view to determining a zone in which a UWB device is located among a predetermined set of zones, by applying a function dependent on a set of physical quantities, is provided. The set of physical quantities includes, for each respective UWB sensor, at least one respective physical quantity dependent on the position of the UWB device with respect to the respective UWB sensor. The function comprises one or more generalized linear models. Each generalized linear model takes as input a respective subset of the physical quantities. Each generalized linear model comprises respective weights and a respective decision boundary. The method comprises, by each respective UWB sensor, a measurement with a view to obtaining a measured value of the respective physical quantity. The measurement by one or more first UWB sensors succeeds and the measurement by one or more second UWB sensors fails. The respective subset of at least one generalized linear model comprises at least one physical quantity for which the measurement failed. The method comprises, for each generalized linear model comprising at least one physical quantity for which the measurement failed, and for each physical quantity for which the measurement failed, determination of a replacement value of the physical quantity for application of the generalized linear model. The replacement value is equal to the antecedent of the respective decision boundary by the generalized linear model divided by the sum of the respective weights. The method comprises evaluation of the function based on the set consisting of each measured value and of each replacement value.

The method improves localization of the UWB device.

Specifically, the method makes it possible to determine the zone in which the UWB device is located despite the failure of the measurement of at least one physical quantity used by the function. Determination of a replacement value for each physical quantity for which the measurement failed makes it possible to complete the missing values in the set of physical quantities, and therefore to apply each generalized linear model based on this completed set with a view to determining the zone in which the UWB device is located. Use of one or more replacement values therefore allows the UWB device to be localized, despite the failure of one or more of the measurements by the UWB sensors.

In particular, the replacement value determined by the method makes it possible to limit the impact of the absence of a measured value for at least one physical quantity. This improves the reliability of the localization of the UWB device, despite the presence of one or more failed measurements. Specifically, use, as a replacement value, of the antecedent of the respective decision boundary by the generalized linear model divided by the sum of the respective weights makes it possible to limit the contribution of each replacement value in the result delivered by the function. Thus, the calculation by the function is based more on the values of the successful measurements than on those with a replacement value, in order to deliver a result. This improves determination of the zone in which the UWB device is located in the event of a (or more than one) failed measurement(s).

The determination of the zone in which the UWB device is located, i.e. localization of the UWB device (or indeed even classification of the UWB device), may be used in the execution of one or more functionalities of the vehicle. For example, the predetermined set of zones may comprise a first zone designating inside the vehicle and a second zone designating outside the vehicle, and the functionality may comprise activation of a function of the vehicle depending on the zone in which it is determined that the UWB device is located. For example, the functionality may comprise closing the vehicle when it is determined that the UWB device is located in the second zone outside the vehicle, for example after a predetermined period of time has passed between the moment when it is determined that the UWB device is outside. In other examples, the functionality may comprise, after the determination that the UWB device is located outside (also after a predetermined time has passed for example), detection of an abnormal event in the vehicle, for example that a child and/or animal has been left in the vehicle. For this purpose, the functionality may comprise, after the vehicle has been closed for example, detection of chest movements inside the vehicle (for example a child breathing) and trigger of an alarm. In yet other examples, the functionality may comprise, after it has been determined that the UWB device is located inside the vehicle, activation of one or more functions of the vehicle such as turning on music or adjusting the position of the rear-view mirrors to the person bearing the UWB device. The localization may also be used to execute any combination of these examples of functionality.

During the execution of one or more functionalities of the vehicle, the method may be repeated, for example several times per minute or indeed several times per second. For example, the method may be repeated X times per second with X being a real number. For example, X may be less than 50 and/or greater than 1. For example, the method may be repeated up to 10 times per second. On each repetition, the one or more failed measurements and the one or more successful measurements may be different. For example, in the case where a measurement fails because of an obstruction between the UWB sensor carrying out the measurement and the UWB device, a subsequent measurement by the same UWB sensor may succeed if it occurs after the obstruction ends. Conversely, a measurement made after the start of an obstruction may fail whereas previous measurements by the same UWB sensor succeeded. On each repetition, the one or more replacement values may therefore be determined for different physical quantities.

In some examples, the predetermined set of zones may consist of two zones. For example, the predetermined set of zones may comprise a first zone designating inside the vehicle and a second zone designating outside the vehicle. In other examples, the predetermined set of zones may comprise a first zone designating in front of the vehicle and a second zone designating behind the vehicle. In yet other examples, the predetermined set of zones may comprise a first zone designating the right-hand part of the vehicle and a second zone designating the left-hand part of the vehicle. In the case where the set consists of two zones, the function may consist of a single generalized linear model. The generalized linear model may take as input a subset of the physical quantities (which may be the set itself). The generalized linear model may deliver as output a result indicating a probability that the UWB device is located in the first or second zone.

In other examples, the predetermined set of zones comprises at least three zones. In this case, the function may comprise a plurality of generalized linear models each for one respective pair of the at least three zones. For example, the set may comprise a first zone, a second zone, and a third zone, and the function may comprise three generalized linear models: a first generalized linear model for the pair consisting of the first zone and the second zone, a second generalized linear model for the pair consisting of the second zone and the third zone and a third generalized linear model for the pair consisting of the first zone and the third zone. Each generalized linear model may take as input a respective subset of the physical quantities. For each generalized linear model, the respective subset taken as input by the generalized linear model may consist of all the physical quantities of the set (i.e. the respective subset may be the set of physical quantities itself). Each generalized linear model may deliver as output a result indicative of a probability that the UWB device is located in a zone of the respective pair of the generalized linear model. The function may also comprise a decision layer delivering a result based on the results of each of the generalized linear models. For example, the decision layer may deliver as result a mean of the results of each of the generalized linear models. The decision layer may take into account the probabilities indicated by each of the generalized linear models (and consider only probabilities that are higher than a threshold for example). Alternatively or additionally, each generalized linear model may designate a zone, for example when the probability calculated by the generalized linear model for this zone is higher than a threshold. In this case, the decision layer may take into account the number of generalized linear models designating each zone (and for example deliver as result the zone designated by the highest number of generalized linear models).

In each of these examples, the result delivered by a generalized linear model may be a probability that the UWB device is located in one of the zones of the predetermined set. Each generalized linear model may comprise a layer applying a linear regression to the respective subset taken as input, followed by a layer applying a strictly monotonic function to the result of the linear regression. At least one generalized linear model may consist of a logistic regression. For example, each generalized linear model may consist of a logistic regression. In this case, the strictly monotonic function of each generalized linear model may be a sigmoid function.

The linear regression may comprise a linear relationship between a delivered result and the data taken as input by the linear regression. The linear regression may comprise, for each physical quantity i of the respective subset taken as input by the linear regression (with i ranging from 1 to n, n being the number of physical quantities in the respective subset), a respective weight $w_i$ associated with the physical quantity i. The respective weights $w_i$ may form a vector W. The linear regression may take as input a vector X having, for each physical quantity i of the respective subset taken as input by the linear regression, a respective coordinate $x_i$ associated with the physical quantity i, and, for each coordinate of the vector $x_i$, a value $v_i$ of the physical quantity i associated with the coordinate $x_i$. The value $v_i$ is the value measured when the measurement of the physical quantity succeeds, or else is the determined replacement value when the measurement of the physical quantity fails. The linear regression may deliver as output a value y in $\mathbb{R}$ such that:

$$y = X \cdot W = \sum_{i=1}^{n} x_i \cdot w_i. \qquad \text{[Math 1]}$$

The generalized linear model may then comprise application of a strictly monotonous function g of $\mathbb{R} \rightarrow [0, 1]$ to the result y delivered as output from the linear regression. The function g may for example be a sigmoid function. The result of application of the function g to the value y delivered as output by the linear regression may indicate a probability that the UWB device is located in the first or second zone.

Each generalized linear model may have been trained prior to execution of the method (in a supervised manner). For example, each generalized linear model may have been trained using a training dataset comprising experimental data comprising, for each physical quantity and for various positions of the UWB device in the various zones, a value measured by the UWB sensors of the physical quantity and, for each position, the localization of the UWB device associated with the values measured for that position. Before training, the data of the set may have been standardized. For example, for each physical quantity, the measured values may have been standardized in a format having a zero mean and a standard deviation of 1. For this purpose, the standardization may comprise, for each physical quantity, subtraction of each measured value of the physical quantity by a mean of the values measured for the physical quantity and division of the result of the subtraction by a standard deviation of the values measured for the physical quantity. The training of the generalized linear model may comprise determination of the weights $w_i$ of the linear regression.

The result delivered by each generalized linear model may be a value calculated by the generalized linear model and located within a predetermined interval of possible values (for example, the interval of real numbers between 0 and 1 in the case where the result indicates a probability of presence in a zone). The location of this calculated value in the predetermined interval of possible values may determine the zone in which the generalized linear model determines that the UWB device is located. This zone may be the first or second zone in the case where the set consists of two zones, or indeed a zone of the respective pair of zones of the generalized linear model in the case where the set consists of at least three zones.

The respective decision boundary of the generalized linear model may delineate, in the predetermined interval of possible values, two portions each corresponding to one respective zone (i.e. to the first or second zone in the case where the set consists of two zones, or indeed to each zone of the respective pair of zones of the generalized linear model in the case where the set consists of at least three zones). The determination of the zone in which the UWB device is located may depend on the portion in which the calculated value is located. For example, the predetermined interval of possible values may be the interval of real numbers between 0 and 1, and the decision boundary may be the value 0.5. In this case, a calculated value comprised between 0 and 0.5 may mean that the UWB device is located in a first zone and a calculated value comprised between 0.5 and 1 may mean that the UWB device is located in a second zone (or vice versa). Each generalized linear model may also deliver a level of confidence in the obtained result. For example, the distance of the calculated value from the decision boundary may quantify this level of confidence in the obtained result. For example, returning to the example of the interval between 0 and 1, a calculated value close to 0 or 1 may indicate a result with a higher confidence than another having a calculated value close to the decision boundary of 0.5.

The value may be calculated by the generalized linear model based on the respective weights of the generalized linear model and on each (measured or replacement) value of the physical quantities of the respective subset taken as input by the generalized linear model. For example, the respective subset of a generalized linear model may comprise physical quantities having values $v_i$ (with i ranging from 1 to n, n being the number of physical quantities in the respective subset), and the generalized linear model may comprise a respective weight $w_i$ associated with each value $v_i$. The calculation of the value delivered as output by the generalized linear model $f(v_1, v_2, \ldots, v_n)$ may be based on the following formula:

$$f(v_1, v_2, \ldots, v_n) = g(v_1 w_1 + v_2 w_2 + \ldots + v_n w_n) \qquad \text{[Math 2]}$$

in which g is a strictly monotonic function of $\mathbb{R} \to [0, 1]$, each weight $w_i$ representing the contribution of the value $v_i$ to the final probability calculated by the generalized linear model. The function g may for example be a sigmoid function.

With these notations, the antecedent u of the respective decision boundary η by the generalized linear model is such that:

$$g(\mu)=\eta. \quad \text{[Math 3]}$$

For each generalized linear model, the antecedent u exists and is unique since the intermediate value theorem applies. The calculation of the antecedent μ may be based on the following formula:

$$\mu=g^{-1}(\eta) \quad \text{[Math 4]}$$

in which $g^{-1}$ is the reciprocal function of the function g.

The calculation of the replacement value v' for each physical quantity for which the measurement failed may be based on the following formula:

$$v' = \frac{\mu}{\sum_{i=1}^{n} w_i}. \quad \text{[Math 5]}$$

The evaluation of the function may comprise, for each generalized linear model, delivery of the respective subset taken as input by the linear model, application of the generalized linear model to the respective subset, and calculation by the generalized linear model, to deliver as output a result. These delivery, application and calculation steps may be carried out in parallel or sequentially for each generalized linear model. Delivery of the respective subset may comprise, for each generalized linear model comprising at least one physical quantity for which the measurement failed, and for each physical quantity for which the measurement failed, delivery of the replacement value for the physical quantity. At least one generalized linear model delivers a result based on a respective subset that comprises, for each physical quantity for which the measurement succeeded, the value delivered by the measurement, and, for each physical quantity for which the measurement failed, a replacement value for the physical quantity. For each generalized linear model, in the case where the respective subset of the generalized linear model comprises a plurality of physical quantities for which the measurement failed, the replacement value may be the same for each of the physical quantities for which the measurement failed.

The evaluation may then comprise delivery of a result based on the one or more results delivered by each generalized linear model. In the case where the predetermined set of zones consists of two zones, the result delivered by the function may be that of the single generalized linear model (the function then comprising only one generalized linear model and therefore having only one result). In the case where the predetermined set of zones comprises at least three zones, the delivered result may be determined based on the results delivered by each of the generalized linear models for each pair of the predetermined set of zones. For example, the evaluation may determine that the UWB device is located in the zone that obtained the most results delivered by the generalized linear models indicating a probability that it is located in that zone. In the case where the function comprises a decision layer, it is this layer that may carry out the determination of the zone in which the UWB device is located based on the results delivered by each of the generalized linear models.

At least one generalized linear model may comprise a respective standardization block for each physical quantity of the respective subset. For example, each generalized linear model may comprise one respective standardization block. The standardization block of a generalized linear model may execute a standardization of the value of each physical quantity of the respective subset taken as input by the generalized linear model. The standardization may comprise conversion of the values into a predetermined format. The standardization may comprise scaling of the values. For example, the standardization may comprise, for each physical quantity of the respective subset, subtraction of the physical quantity by a mean and division of the result of the subtraction by a standard deviation. The mean and standard deviation may depend on the physical quantity. The mean and standard deviation may be predetermined. The mean and standard deviation may have been obtained during training of the generalized linear model (supervised training for example). The mean and standard deviation may correspond to the mean and standard deviation of the values measured for the physical quantity that are used to standardize the training dataset at the time when the generalized linear model is trained.

Standardization of the values improves the reliability of localization of the UWB device despite the presence of a (or more than one) failed measurement(s). Specifically, standardization unifies the impact of each value on the result, and therefore reduces the risk that replacement values will have more impact on the result than measured values. This therefore allows the risk that the reliability of the generalized linear model will be reduced because of the replacement values (the impact of each value, whether measured or not, being limited). Standardization therefore contributes to limitation of the contribution of each replacement value to the result delivered by the function, and therefore to improvement of the reliability of the localization of the UWB device.

A measurement may succeed, i.e. the measurement may succeed in delivering a measured value of the physical quantity. Alternatively, a measurement may fail, i.e. the measurement may fail to deliver a measured value of the physical quantity. For example, the method may comprise an obstruction between the respective UWB sensor and the UWB device at the time of the measurement. The obstruction may cause the measurement to fail. For example, the obstruction may prevent (partially or totally) signal exchange between the UWB sensor carrying out the measurement and the UWB device. The obstruction may be induced by the passage of an obstacle between the UWB sensor carrying out the measurement and the UWB device (for example passage of an arm of a user of the vehicle or indeed passage of an object). Alternatively or additionally, the obstruction may be induced by waves emitted by another device (for example a mobile phone). The measurement may comprise, in order to succeed, signal exchange between the respective UWB sensor and the UWB device, and passage of the obstacle or the waves emitted by the other device may prevent the signal exchange of the measurement, thus causing the measurement to fail. The obstruction of a failed measurement may have a duration greater than 5 seconds, 10 seconds, 30 seconds or 1 minute. The method therefore allows reliable localization of the UWB device despite the presence of the obstruction(s) that caused the failure of the measurement(s).

The proportion of successful measurements may be equivalent to or greater than the proportion of failed measurements. For example, the number of successful measurements may be higher than or equal to the number of failed measurements. The total number of measurements may be higher than or equal to 4 and the number of failed measurements may be lower than or equal to 2, or indeed the total number of measurements may be higher than or equal to 6 and the number of failed measurements may be lower than or equal to 3.

The function of each measurement is to allow a measured value of a physical quantity to be obtained. At least one physical quantity may depend on the position of the UWB device with respect to the UWB sensor carrying out the measurement. The measured value of the at least one physical quantity may vary depending on the zone in which the UWB device is located. For example, the physical quantity may be dependent on the distance between the UWB sensor carrying out the measurement and the UWB device. In this case, the measured value may vary depending on the distance between the UWB sensor carrying out the measurement and the zone in which the UWB device is located. For example, at least one physical quantity may be a time of flight. The time of flight may represent a duration of a signal exchange between the UWB sensor and the UWB device. For example, the duration may be the time taken by a signal to go from the UWB sensor to the UWB device and then back from the UWB device to the UWB sensor. The time of flight may be proportional to the distance between the UWB sensor and the UWB device. Alternatively or additionally, at least one physical quantity may be a power. The power may represent the power of a signal received by the UWB sensor. For example, the signal received by the UWB sensor may be a signal sent by the UWB device in response to a signal received by the UWB device and sent by the UWB sensor.

In some examples, the UWB system may comprise at least two UWB sensors. For each UWB sensor, the set of physical quantities may comprise a physical quantity that is a time of flight and a physical quantity that is a power.

The UWB device may be borne by a user of the vehicle. For example, the UWB device may be a card, a key, or a mobile phone. The UWB device and the UWB sensors may use a UWB communication protocol, such as that specified by IEEE 802.15.4. The UWB device and the UWB sensors may be configured to exchange signals with each other.

A computer program for a vehicle UWB system is also provided. The computer program may be stored on a non-volatile memory (for example a memory of a UWB system). The computer program comprises instructions for carrying out the method. For example, the computer program may comprise instructions for carrying out the method when said program is executed by a processor (for example a processor of a UWB system).

A vehicle UWB system is also provided. The UWB system is configured to execute the method. The UWB system comprises a memory on which the computer program is stored. The UWB system may comprise a processor for executing said program. The UWB system may comprise at least two UWB sensors. The UWB system may also comprise a central computer. The central computer may comprise the memory and the processor of the UWB system. The UWB system may also comprise means for connecting between the central computer and each of the at least two UWB sensors (for example cables connecting the central computer with each of the UWB sensors).

Examples will now be given with reference to FIGS. 1 to 6.

In these examples, the predetermined set of zones within which the method determines that the UWB device 20 is located consists of two zones. The predetermined set of zones comprises a zone A 11 and a zone B 12. The UWB device 20 is located in the zone A 11. The function consists of a single generalized linear model. The vehicle comprises n UWB sensors 21, 22 and 23.

FIG. 1 illustrates one example of a flowchart of the method. The method is implemented by a vehicle UWB system including at least two UWB sensors and determines S10 a zone in which a UWB device is located among a predetermined set of zones, by applying a function dependent on a set of physical quantities. The set of physical quantities includes, for each respective UWB sensor, at least one respective physical quantity dependent on the position of the UWB device with respect to the respective UWB sensor. The function comprises one or more generalized linear models. Each generalized linear model takes as input a respective subset of the physical quantities. Each generalized linear model comprises respective weights and a respective decision boundary. The method comprises, by each respective UWB sensor, a measurement S20 with a view to obtaining a measured value of the respective physical quantity. The measurement by one or more first UWB sensors succeeds and the measurement by one or more second UWB sensors fails S40. The method comprises an obstruction S30 between the respective UWB sensor and the UWB device at the time of measurement during at least one failed measurement. The respective subset of at least one generalized linear model comprises at least one physical quantity for which the measurement failed. The method comprises, for each generalized linear model comprising at least one physical quantity for which the measurement failed, and for each physical quantity for which the measurement failed, determination S50 of a replacement value of the physical quantity for application of the generalized linear model. The replacement value is equal to the antecedent of the respective decision boundary by the generalized linear model divided by the sum of the respective weights. The method comprises evaluation S60 of the function based on the set consisting of each measured value and of each replacement value.

Figure 2:
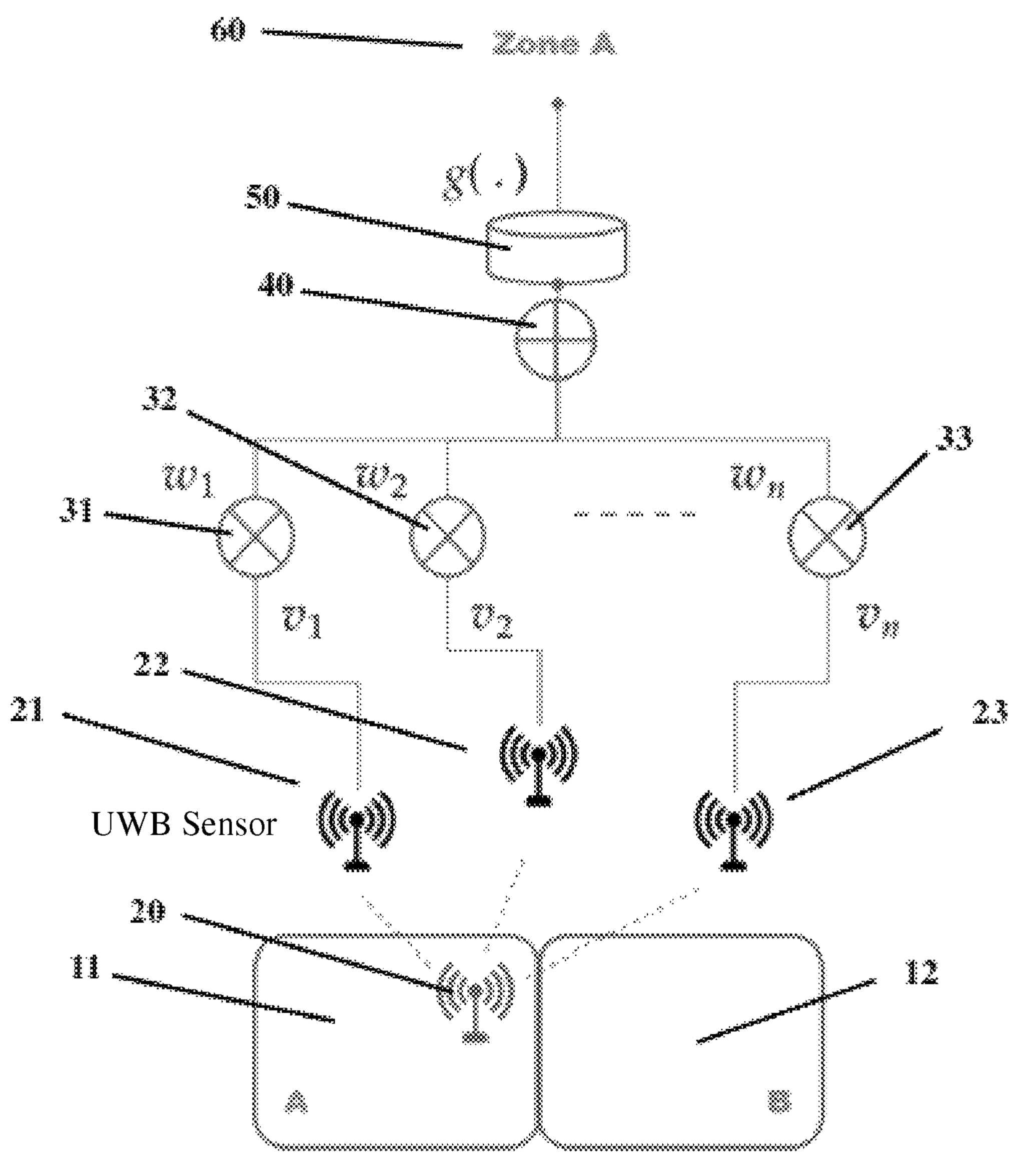
FIG. 2 illustrates one example of localization of the UWB device without measurement failure.

FIG. 2 illustrates one example of localization of the UWB device 20 without measurement failure. In the example of this figure, the UWB device 20 is localized without the use of the method. Specifically, the measurements by each of the UWB sensors 21, 22 and 23 are successful. Each measurement therefore allows a measured value $v_i$ of a physical quantity to be obtained. Application of the generalized linear model to these measured values $v_i$ comprises, for each measured value, multiplication 31, 32, 33 of the measured value by a respective weight $w_i$ of the generalized linear model, then calculation of a sum 40 of the results of each multiplication 31, 32, 33. Application of the generalized linear model then comprises application 50 of a function g to the sum thus calculated. The generalized linear model delivers as output a result 60 (here "zone A") indicating the zone in which the generalized linear model determines that the UWB device 20 is located depending on the measurements by the UWB sensors 21, 22 and 23.

Figure 3:
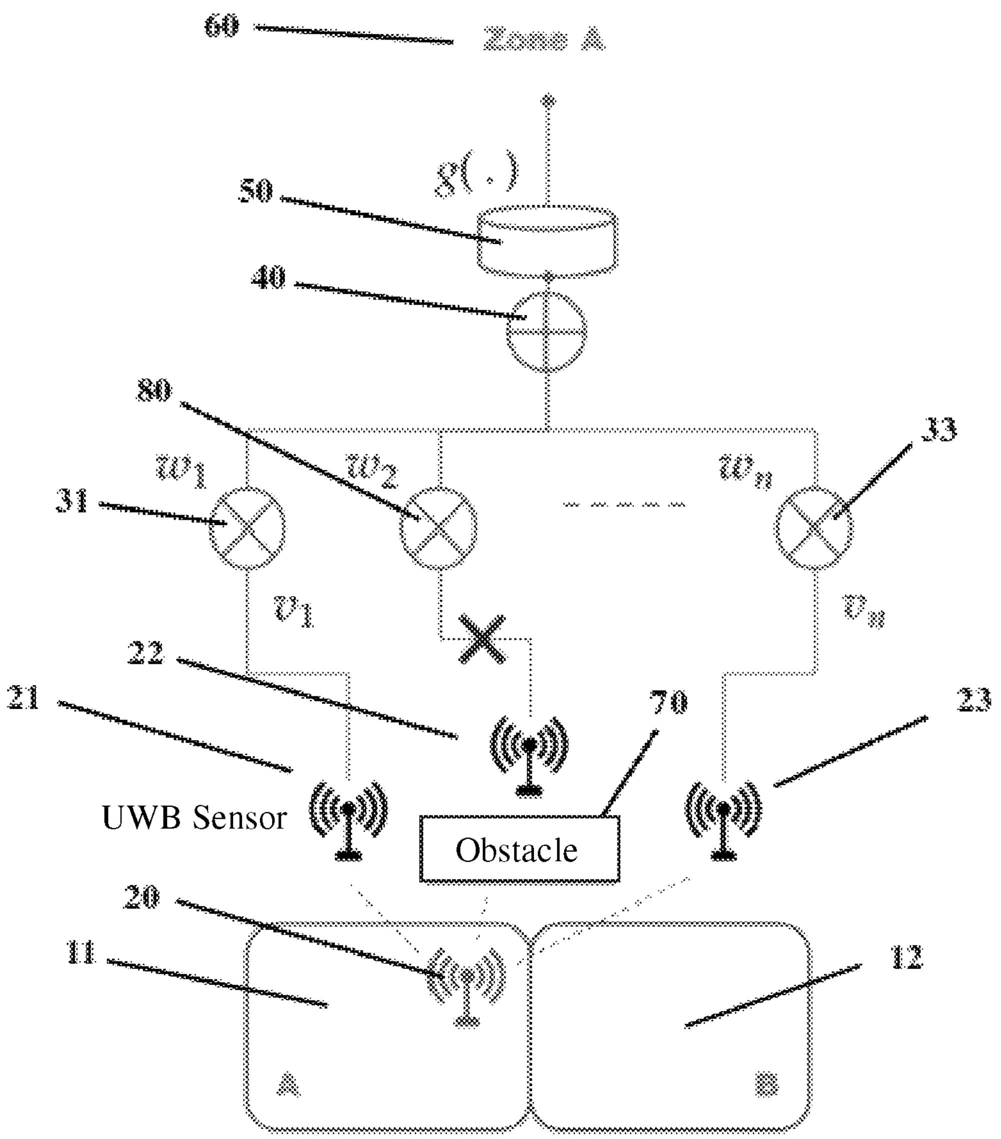
FIG. 3 illustrates one example of localization of the UWB device with measurement failure.

FIG. 3 illustrates one example of localization of the UWB device 20 with measurement failure. In this example, the UWB device 20 is localized using the method. The method comprises, by each respective UWB sensor 21, 22, 23, a measurement with a view to obtaining a measured value of the respective physical quantity. For the UWB sensors 21 and 23, the measurement succeeds in delivering a value $v_i$. In contrast, for the UWB sensor 22, the measurement fails to deliver a value. The failure of the measurement for the UWB sensor 22 is due to the presence of an obstacle 70 between the UWB sensor 22 and the UWB device 20 at the time of the measurement.

Thus, the subset of physical quantities of the generalized linear model comprises a physical quantity for which the measurement has failed (the physical quantity measured by the UWB sensor 22). The generalized linear model cannot therefore be applied to this subset because of the missing value measured for a physical quantity. For this physical quantity for which the measurement failed, the method comprises determining a replacement value v' of the physical quantity for the application of the generalized linear model. The replacement value v' is equal to the antecedent u of the decision boundary η by the generalized linear model divided by the sum of the respective weights $w_i$.

The method then comprises evaluation of the function based on the set consisting of the measured values $v_i$ for the UWB sensors 21 and 23 and of the replacement value v' for the UWB sensor 22. The evaluation comprises application of the generalized linear model to the set consisting of the measured values $v_i$ for the UWB sensors 21 and 23 and of the replacement value v' for the UWB sensor 22. Application of the generalized linear model to the values of this set comprises, for each measured value, multiplication 31, 33 of the measured value by a respective weight $w_i$ of the generalized linear model, and for the replacement value v', multiplication 80 of the replacement value v' by the respective weight $w_2$ associated with the physical quantity the measurement of which failed. Next, application of the generalized linear model comprises calculation of a sum 40 of the results of each multiplication 31, 80, 33 and application 50 of a function g to the sum thus calculated. The generalized linear model delivers as output a result 60 (here "zone A") indicating the zone in which the generalized linear model determines that the UWB device 20 is located depending on the values measured by the UWB sensors 21 and 23 and on the replacement value v' for the UWB sensor 22.

Figure 4:
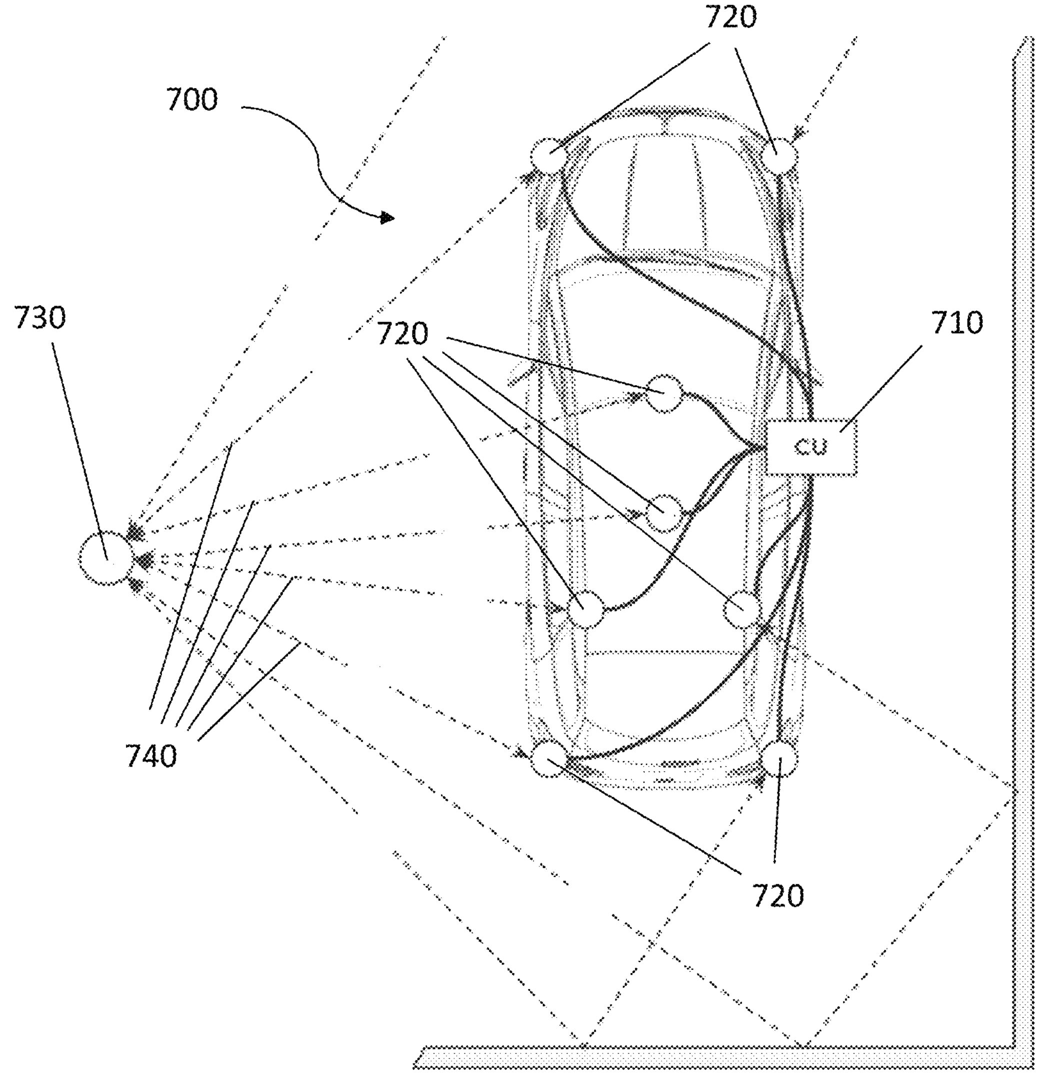
FIG. 4 illustrates one example of a vehicle UWB system.

FIG. 4 illustrates one example of a UWB system 710 of a vehicle 700. The UWB system comprises a plurality of UWB sensors 720 positioned at the front of the vehicle, at the rear of the vehicle (i.e. outside the vehicle) or indeed inside the vehicle (i.e. in the passenger compartment). The figure also shows a UWB device 730. The UWB system 710 is configured to execute the method for determining a zone in which the UWB device 730 is located among a predetermined set of zones, by applying a function dependent on a set of physical quantities. The set of physical quantities includes, for each UWB sensor 720, at least one respective physical quantity dependent on the position of the UWB device 730 with respect to the UWB sensor 720 (for example a physical quantity that is a function of the distance 740 between the UWB device 730 and the UWB sensor 720). The predetermined set of zones may for example comprise two zones (one designating outside the vehicle and the other inside), and the method may determine that the UWB device 730 is located in the zone designating outside the vehicle.

Figure 5:
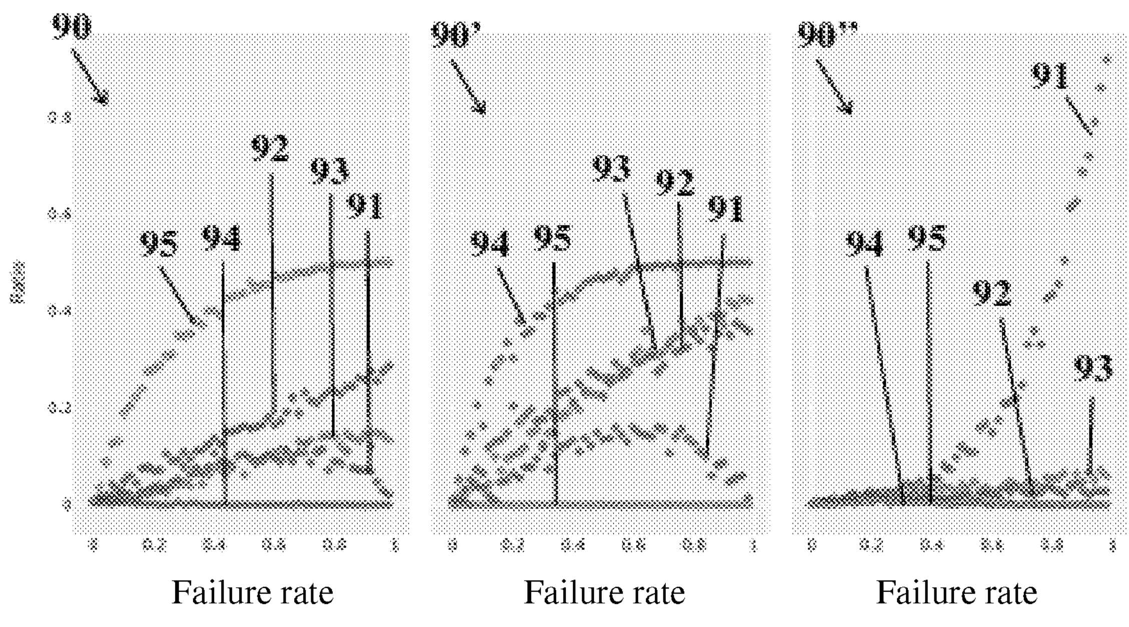
FIG. 5 and FIG. 6 show examples of results of the method.
Figure 6:
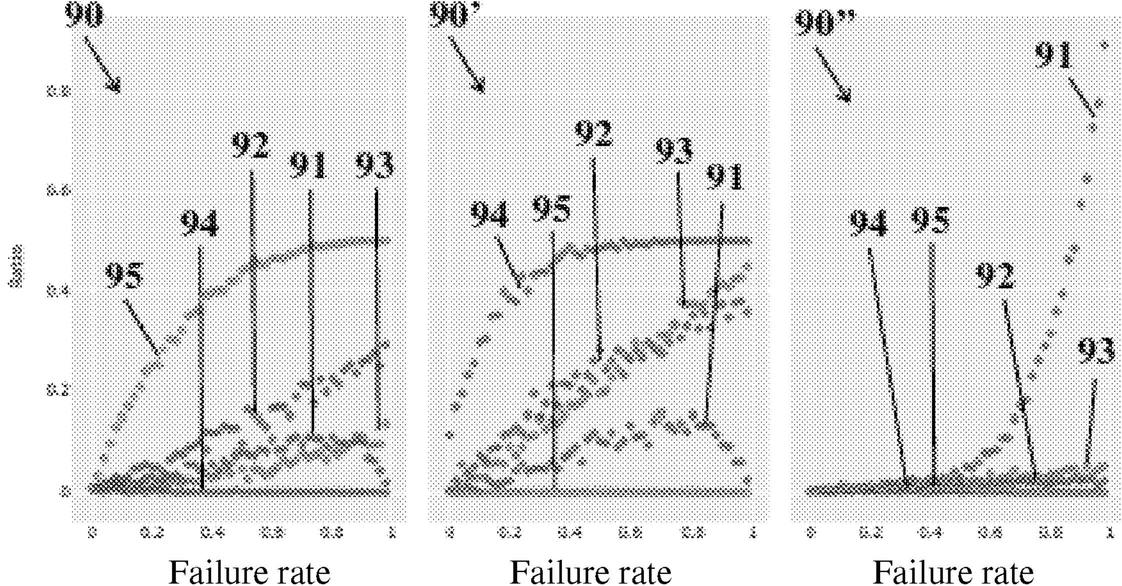

With reference to FIG. 5 and FIG. 6, examples of results of the method will now be presented.

FIGS. 5 and 6 show examples of results for two UWB-system configurations: a first with two UWB sensors and a second with three UWB sensors. The predetermined set of zones consisted of two zones A and B. Zone A was identified as the positive zone and zone B was identified as the negative zone. Thus, a true positive designated a sample of zone A that the model predicted as belonging to zone A, and a false negative was a sample of zone B that was classified by the model as belonging to zone A (and likewise for the other cases true negative and false positive).

These evaluations were conducted with real models on real data. However, to better visualize the effects of the method, the datasets were augmented by randomly masking certain measurements.

For each sample to be classified, there were three possible model decisions:

- positive decision (zone A, probability higher than a given threshold),
- negative decision (zone B, probability lower than a second threshold),
- no decision (probability comprised between the two previous thresholds).

In this example, the thresholds were equal to 0.6 and 0.4 for the positive and negative decisions, respectively.

In each of the graphs of FIGS. 5 and 6, the x-axis represents the measurement failure rate, in other words the proportion of measurement failure for each physical quantity (random). Metrics for evaluating model performance are plotted on the y-axis, namely the false-positive rate (TFP, defined as the ratio of the number of false positives to the total number of negatives) for the graphs 90, the false-negative rate (TFN, defined as the ratio of the number of false negatives to the total number of positives) for the graphs 90', and the non-decision rate (TND, equal to the proportion of non-decisions) for the graphs 90".

The graphs in FIGS. 5 and 6 show a comparison of the results obtained with the method (curves 91) and with various methods for assigning the values for which the measurement failed (curves 92 to 95). The various assigning methods evaluated included:

- a "minimum" assigning method (curves 94): the missing values were replaced by the statistical minimum thereof observed in the training sets (excluding extreme values);
- a "mean" assigning method (curves 93): the missing values were replaced by the statistical mean thereof observed in the training sets;
- a "maximum" assigning method (curves 95): the missing values were replaced by the statistical maximum thereof observed in the training sets (excluding extreme values); and
- a "random" assigning method (curves 92): the missing values followed a normal distribution of mean and standard deviation identical to those of the data sets used for the training. This assignment allowed a reference database to be obtained.

FIG. 5 shows the results obtained by the method and by the various assigning methods in the case of the first configuration (two UWB sensors), and FIG. 6 in the case of the second configuration (three UWB sensors).

The graphs highlight the reliability of the predictions made by the method. Specifically, at least for moderate failure rates, the false-positive and false-negative rates remain below 16% with the method.

The graphs also highlight the advantage of the method over other assigning techniques that might be implemented. It will be noted that the false-positive rate is similar in the case of a mean assignment for low physical-value-measurement failure ratios, but that the method has the advantage of bringing back samples for which the prediction is uncertain around a probability close to 0.5, this enabling better decision-making later. This could not be done manually because it is previously unknown which samples these "sensitive" samples are. Rules built for example based on the number of missing values would miss samples that could have been correctly classified via a relevant assignment.

The invention claimed is:

1. A method implemented by a UWB system of a vehicle, wherein the UWB system includes at least two UWB sensors, with a view to determining a zone in which a UWB device is located among a predetermined set of zones, by applying a function dependent on a set of physical quantities including, for each respective UWB sensor, at least one respective physical quantity dependent on the position of the UWB device with respect to the respective UWB sensor, the function comprising one or more generalized linear models, each generalized linear model taking as input a respective subset of the physical quantities, each generalized linear model comprising respective weights and a respective decision boundary, the method comprising:

measuring a respective physical quantity with each UWB sensor, wherein the measurement by one or more first UWB sensors succeeds and the measurement by one or more second UWB sensors fails, wherein the generalized linear model comprises at least one physical quantity for which the measurement failed;

determining a replacement value of the physical quantity for application of the generalized linear model, for each generalized linear model comprising at least one physical quantity for which the measurement failed and for each physical quantity for which the measurement failed, wherein the replacement value is equal to the antecedent of the respective decision boundary by the generalized linear model divided by the sum of the respective weights; and evaluating the function based on the set consisting of each measured value and of each replacement value.

2. The method according to claim 1, wherein at least one generalized linear model comprises a respective standardization block for each physical quantity of the respective subset.

3. The method according to claim 2, wherein standardization comprises subtraction of the physical quantity by a mean and division of the result of the subtraction by a standard deviation, the mean and the standard deviation having been obtained during training of the generalized linear model.

4. The method according to claim 1, wherein the method comprises an obstruction between the respective UWB sensor and the UWB device at the time of the measurement during at least one failed measurement.

5. The method according to claim 4, wherein the obstruction of the at least one failed measurement has a duration greater than 5 seconds.

6. The method according to claim 1, wherein, for each respective UWB sensor, the at least one respective physical quantity dependent on the position of the UWB device with respect to the respective UWB sensor comprises a time of flight or a power.

7. The method according to claim 1, wherein at least one generalized linear model is logistic regression.

8. The method according to claim 1, wherein:

the predetermined set of zones consists of two zones, the function consisting of a single generalized linear model, or the predetermined set of zones comprises at least three zones, the function comprising a plurality of generalized linear models each for one respective pair of the at least three zones and a decision layer delivering a result based on the results of each of the generalized linear models.

9. A non-transitory computer-readable storage medium comprising instructions that, when executed by a processor of a UWB system for a vehicle, cause the processor to perform the method of claim 1.

* * * * *